US010814565B2

(12) United States Patent
Ingram et al.

(10) Patent No.: US 10,814,565 B2
(45) Date of Patent: Oct. 27, 2020

(54) MOULD ARRANGEMENT AND METHOD FOR COMPRESSION MOULDING FIBER REINFORCED PREFORMS

(71) Applicants: Magna International, Inc., Aurora (CA); John A. Ingram, Richmond Hill (CA); Philip Grella, Toronto (CA); Don Haag, Davisburg, MI (US); Matthew R. Plaumann, New Baltimore, MI (US); Jeremy A. Panasiewicz, Macomb, MI (US); Tyler W. Hardy, Clinton Township, MI (US)

(72) Inventors: John A. Ingram, Richmond Hill (CA); Philip Grella, Toronto (CA); Don Haag, Davisburg, MI (US); Matthew R. Plaumann, New Baltimore, MI (US); Jeremy A. Panasiewicz, Macomb, MI (US); Tyler W. Hardy, Clinton Township, MI (US)

(73) Assignee: MAGNA INTERNATIONAL INC., Aurora, Ontario (CA)

( * ) Notice: Subject to any disclaimer, the term of this patent is extended or adjusted under 35 U.S.C. 154(b) by 910 days.

(21) Appl. No.: 14/907,380

(22) PCT Filed: Jul. 26, 2014

(86) PCT No.: PCT/US2014/048327
§ 371 (c)(1),
(2) Date: Jan. 25, 2016

(87) PCT Pub. No.: WO2015/013692
PCT Pub. Date: Jan. 29, 2015

(65) Prior Publication Data
US 2016/0167314 A1 Jun. 16, 2016

Related U.S. Application Data

(60) Provisional application No. 61/858,784, filed on Jul. 26, 2013.

(51) Int. Cl.
B29C 70/16 (2006.01)
B29C 70/46 (2006.01)
(Continued)

(52) U.S. Cl.
CPC .......... B29C 70/16 (2013.01); B29C 33/0055 (2013.01); B29C 43/36 (2013.01);
(Continued)

(58) Field of Classification Search
CPC ..................................................... B29C 70/16
See application file for complete search history.

(56) References Cited

U.S. PATENT DOCUMENTS 4,501,715 A 2/1985 Barfield
5,023,041 A 6/1991 Jones et al.

FOREIGN PATENT DOCUMENTS

DE 102010030009 A1 12/2011
EP 2594380 A1 5/2013
(Continued)

OTHER PUBLICATIONS

International Search Report for International Application No. PCT/US2014/048327, dated Nov. 25, 2014.

Primary Examiner — Larry W Thrower
(74) Attorney, Agent, or Firm — WarnPartners P.C.

(57) ABSTRACT

A modified compression moulding arrangement where the compression moulding tool has been modified to allow for the use of pre-impregnated pre-form sheets in order to produce class A automotive structural parts in high volume. The pre-impregnated pre-form has continuous un-chopped fibers that extend across an entire length of the pre-impregnated pre-form. The pre-impregnated pre-form is then placed in an open compression moulding tool that has a bottom half and a top half that are movable between an open position and a closed position. When the mould tool is in the
(Continued)

closed position, the top half and bottom half create a forming cavity that is defined by a forming surface of the top half and a forming surface of the bottom half. The forming surface of the bottom half has a boundary defined by a run-off edge and an upshear that is necessary for forming a class A structural automotive component using pre-impregnated pre-form material.

7 Claims, 5 Drawing Sheets

(51) Int. Cl.
 *B29C 33/00* (2006.01)
 *B29C 43/36* (2006.01)
 *B29C 43/52* (2006.01)
 *B29C 43/58* (2006.01)
 *B29K 105/08* (2006.01)
 *B29K 307/04* (2006.01)

(52) U.S. Cl.
 CPC .............. *B29C 43/52* (2013.01); *B29C 43/58* (2013.01); *B29C 70/46* (2013.01); *B29C 2043/5883* (2013.01); *B29K 2105/0872* (2013.01); *B29K 2307/04* (2013.01)

(56) References Cited

FOREIGN PATENT DOCUMENTS

| | | |
|---|---|---|
| FR | 2587649 A1 | 3/1987 |
| GB | 1008136 A | 10/1965 |
| GB | 2342308 A | 4/2000 |
| GB | 2342889 A | 4/2000 |
| WO | 2014067682 A1 | 5/2014 |

MOULD ARRANGEMENT AND METHOD FOR COMPRESSION MOULDING FIBER REINFORCED PREFORMS

This application is a National Stage of International Application No. PCT/US2014/048327, filed Jul. 26, 2014. This application claims priority to US Provisional Patent Application No. 61/858,784 filed on Jul. 26, 2013. The disclosures of the above applications are incorporated herein by reference.

FIELD OF THE INVENTION

The present invention relates to a compression moulding arrangement using a specially designed compression moulding tool for pre-impregnated preform materials having continuous un-chopped fiber pre-impregnated with resin.

BACKGROUND OF THE INVENTION

The use of pre-impregnated pre-forms for forming moulded parts generally provides high strength due to the presence of fibers within the pre-impregnated preform sheet, which are used for forming a desired part. Traditionally, pre-impregnated preform sheets or materials are moulded in an autoclave process that has a one-sided tool where the pre-impregnated preform material sheet or pre-form is placed over the one-sided tool and then heated in an autoclave under pressure or vacuum that causes the pre-form to mould into a desired shape. The forming stage using an autoclave produces parts that have the high strength and desired finish associated with pre-impregnated preform material. However, the drawback is that the overall process is very slow and expensive to carry out since the steps of forming the material in an autoclave, using high heat and pressure or vacuum, significantly increases the production time and energy costs for creating the moulded part.

The field of compression moulding involves a method of moulding parts in which moulding material, generally a preheated molten material shot, is placed in an open heated mould cavity. The mould is closed with a top force or upper cavity member to applying pressure, which forces the molten material to contact all the mould cavity areas, while heat and pressure is maintained until the moulding material has cured. Generally speaking, compression moulding has been suitable for large basic shape production applications and provides the advantage of allowing articles to be moulded very quickly; however, one of the drawbacks with compression moulding is that the process has been limited in the ability to mould structurally reinforced articles that provide strength and a class A finish. The inability to obtain a class A finish is usually due to the squeezing process, where the part formed will have uneven or warped surfaces in critical locations. It is therefore desirable to develop other moulding arrangements for high volume production of structural automotive parts having a class A finish.

SUMMARY OF THE INVENTION

The present invention relates to a compression moulding arrangement that includes a compression moulding tool having a bottom half and a top half moveable between an open position and a closed position. A forming cavity of the compression moulding tool is defined by a forming surface on the top half and a forming surface on the bottom half of the tool, where the forming cavity is defined when the compression moulding tool is placed into the closed position. The compression moulding arrangement according to the present invention further includes a boundary defined by a runoff and upshear along the forming surface on the bottom half of the mould. The compression moulding arrangement also includes a pre-impregnated pre-form having uncured resin with continuous un-chopped fibers that extend across one of an entire length, width, or both the length and width of the pre-impregnated pre-form.

When the compression moulding tool is in the open position, the pre-impregnated pre-form is placed in the bottom half of the mould and the compression moulding tool is then moved to the closed position. Heat and pressure are applied to the pre-impregnated pre-form, which causes the pre-impregnated pre-form to mould to a certain shape and begin curing the uncured resin. During moulding, portions of the pre-impregnated pre-form become molten material. Some of the molten material is also present in a runoff edge where the pre-impregnated pre-form material will stop flowing to the outer most edges of the forming cavity. The upshear located adjacent the runoff edge limits molten material from the pre-impregnated pre-form from migrating further out of the forming cavity, thereby preventing the compression moulding tool from being locked in place by the use of the pre-impregnated pre-form.

DETAILED DESCRIPTION OF THE INVENTION

Figure 1:
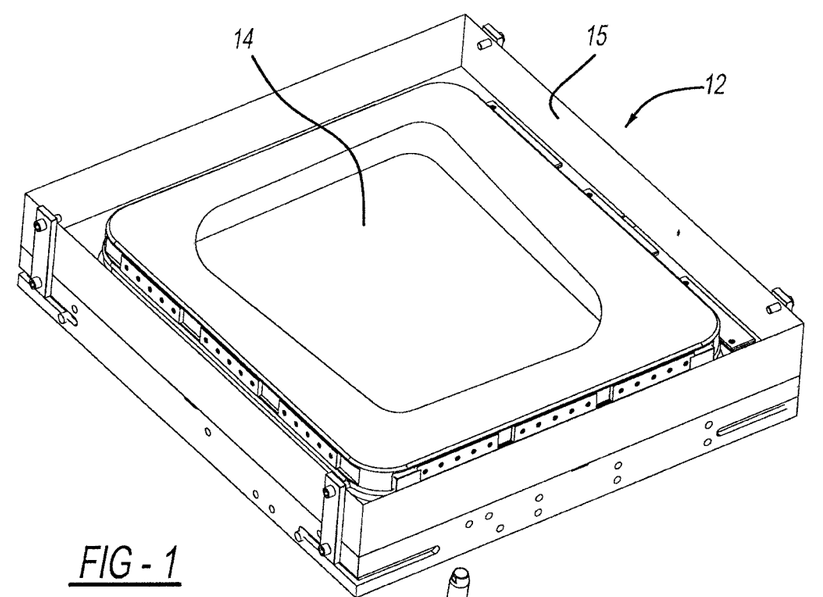
FIG. 1 is a perspective angled view of a top half of the moulding tool.
Figure 2:
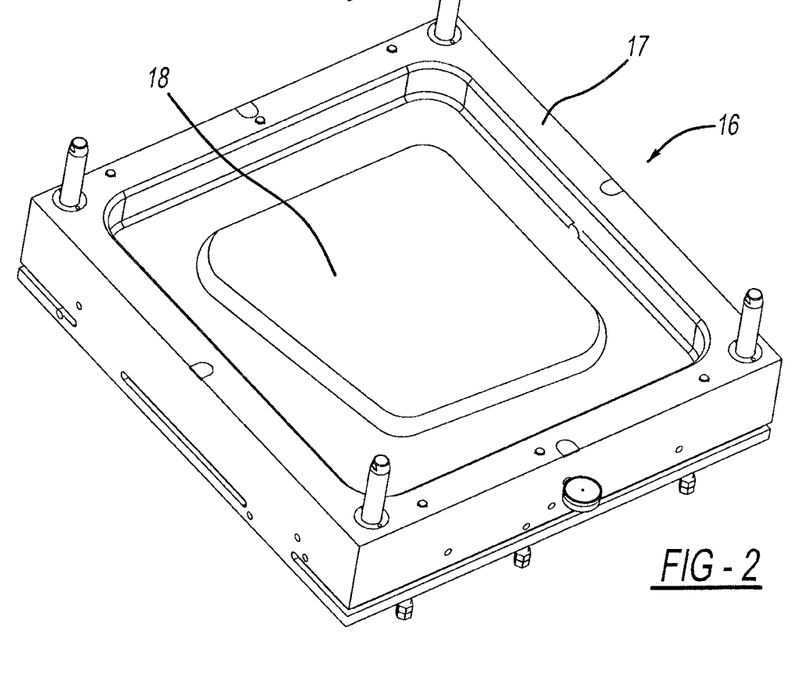
FIG. 2 is a perspective angled view of a bottom half of the moulding tool.
Figure 3:
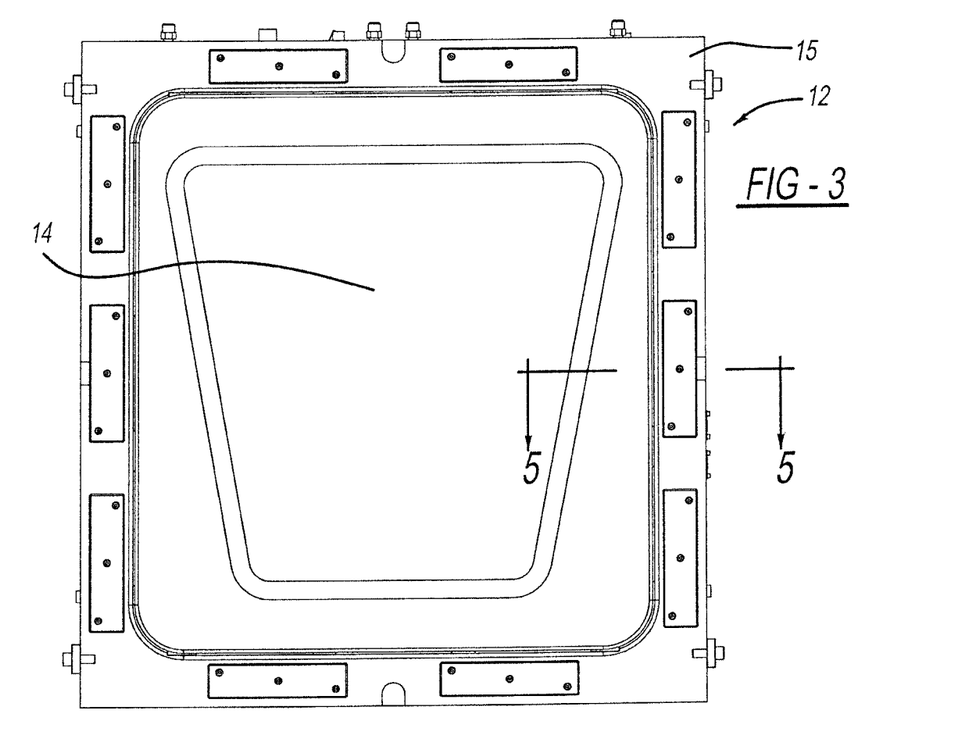
FIG. 3 is an overhead plan view of the moulding tool in the closed position.
Figure 4:
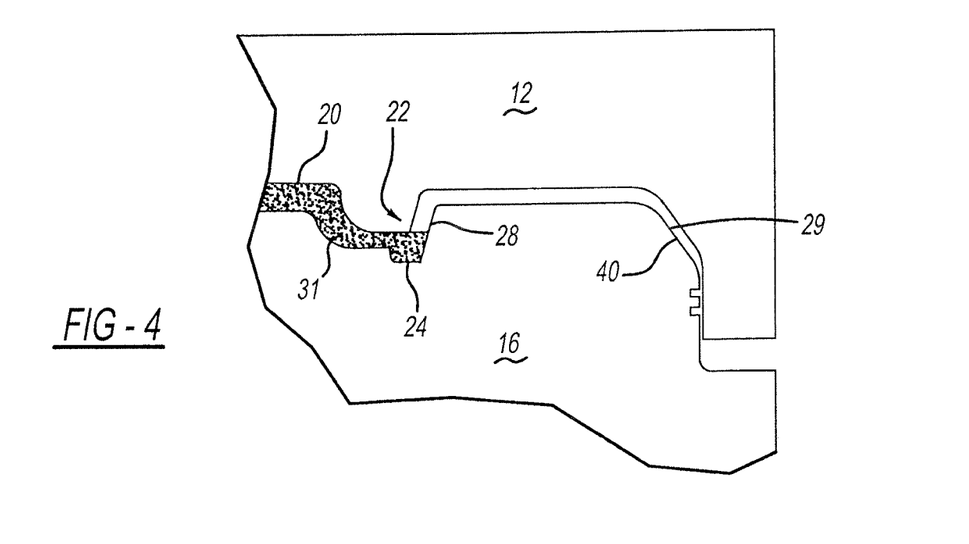
FIG. 4 is a partially cross-sectional side plan view of the moulding tool in the closed position.
Figure 5:
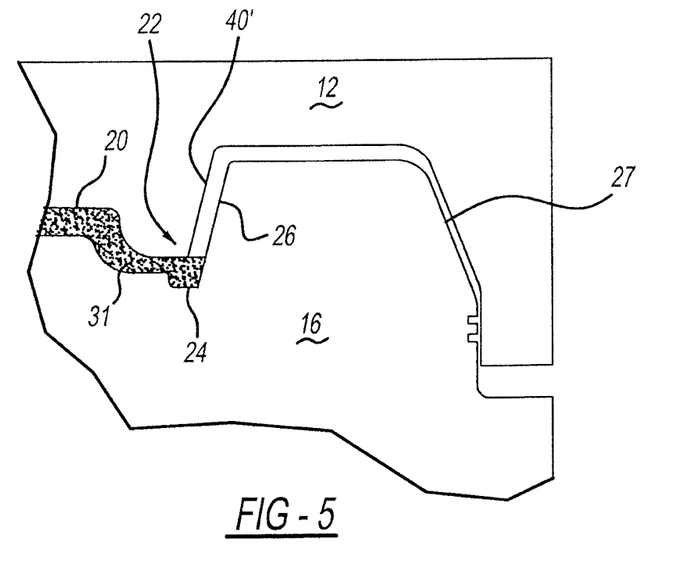
FIG. 5 is a partially cross-section side plan view of an alternate embodiment of the moulding tool in the closed position.
Figure 6:
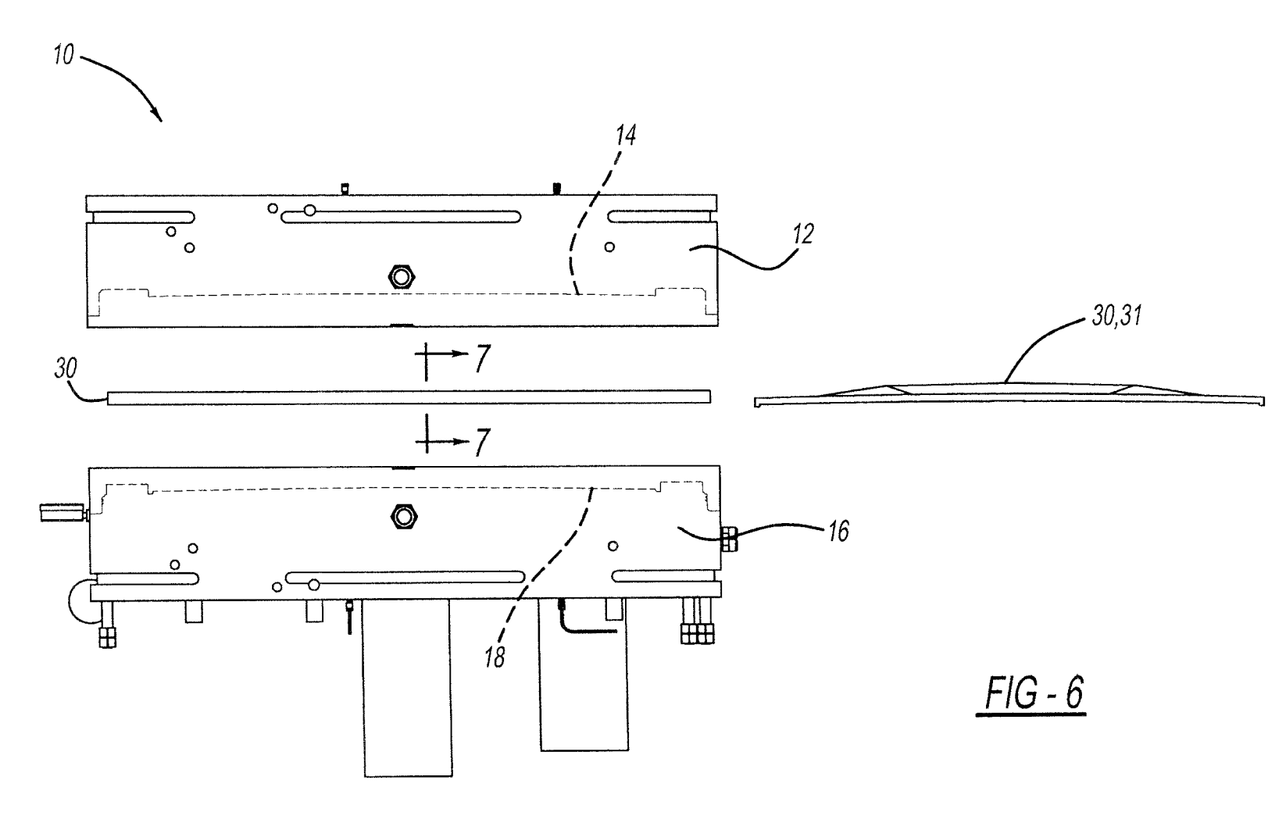
FIG. 6 is a side perspective view of the moulding tool in the open position with the pre-impregnated pre-form being placed into the moulding tool.
Figure 8:
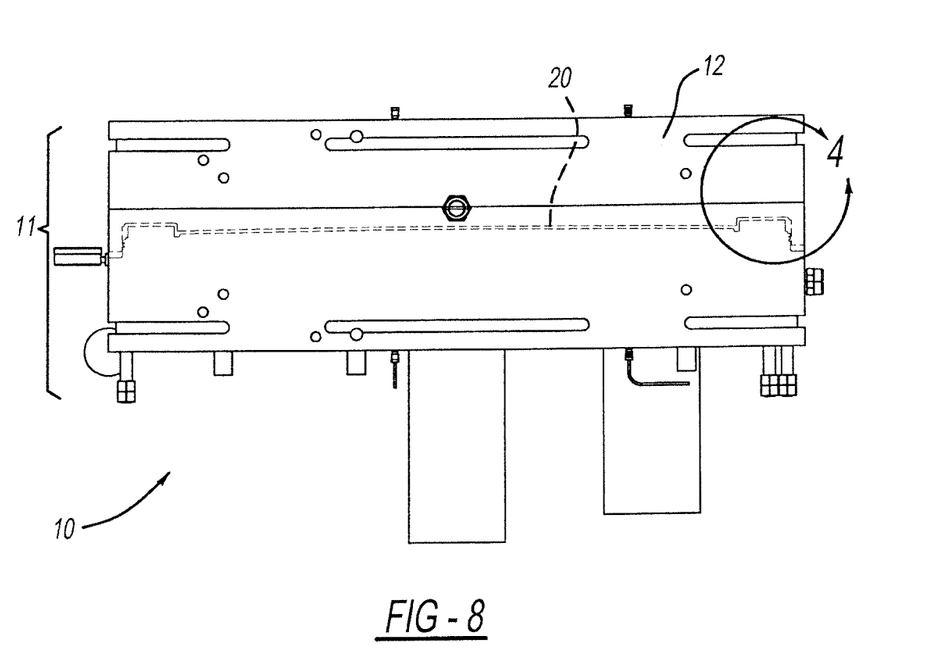
FIG. 8 is a side plan view of the compression moulding tool in the closed position.

The present invention is directed to the use of a modified compression moulding arrangement where the compression moulding tool has been modified to allow for the use of pre-impregnated pre-forms in order to produce automotive parts in high volume and capable of having a desired class A finish. Referring now to all of the Figures with specific reference to FIG. 6 and FIG. 8, a compression moulding arrangement 10 is shown. The compression moulding arrangement 10 includes a compression moulding tool 11 having a top half 12 (also shown in FIG. 1) with a top half forming surface 14 and a top carrier 15 that holds the top forming surface 14. The bottom half 16 (also shown in FIG. 2) has a bottom forming surface 18 and a bottom carrier 17 for holding the bottom forming surface 18. As shown in FIGS. 4-6 and 8, the top half 12 is configured to be positioned over the bottom half 16. The top half 12 and bottom half 16 are configured to move between an open position as shown in FIG. 6 and a closed position as shown in FIG. 8. When the top half 12 and bottom half 16 are in the closed position, the top forming surface 14 and bottom forming surface 18 create a mould cavity or forming cavity 20, as shown in FIGS. 4, 5, and 8.

During a moulding process a pre-impregnated preform 30 is placed between the top half 12 and bottom half 16 of the compression moulding tool 11. The compression moulding tool 11 is preheated to a temperature sufficient to melt a portion of the pre-impregnated preform 30, the compression moulding tool 11 closes and applied pressure to the pre-impregnated preform 30. This processes causing molten resin 31 to form in the forming cavity 20. After the compression and heating process the compression moulding tool 11 is moved to the open position and a finished part is removed. The detailed description refers to a pre-impregnated preform 30, molten material 31 and a finished part. The finished part is created from the pre-impregnated pre-form 30 and molten resin 31; therefore, the finished part and its location within the forming cavity 20 is hereby designated as both reference numerals 30 and 31 in the drawings.

Located on the top forming surface 14 and the bottom forming surface 16 are boundaries 22 which define the desired edge of the formed part 30, 31. During a moulding process a pre-impregnated preform 30 is placed in the mould tool 11 heated and molten resin 31 moves in forming cavity 20. During the compression moulding process a portion of the pre-impregnated preform 30 is present in the boundary 22 (e.g., edge of the finished part) and a run-off edge 24. In the embodiment of the invention shown in FIG. 5, the run-off edge 24 terminates at an up-shear 26 which is a portion of the forming cavity 20 that moves upward relative to the finished surface of the part, which in the drawings of the invention is the portion of the finished part that faces the top forming surface 14. It is within the scope of this invention for the finished surface to be the portion of the finished part 30, 31 that faces the bottom forming surface 18.

FIG. 4 shows an alternate embodiment of the invention having a shorter in height up shear 28 at the run off edge 24 located at the edge of the finished part. Adjacent the up shear 28 is a trailing down shear 29 between the two halves 12, 16 of the compression moulding tool 11.

The up-shear 26, 28 function to prevent molten resin 31 from the pre-impregnated pre-form 30 from migrating between the top half 12, bottom half 16 to the down-shear 27, 29 portion of the compression moulding tool 11. This is shown in both FIG. 4 and FIG. 5. The use of the up-shear 26, 28 provides an advantage over traditional compression moulding tools, which typically have a down-shear located adjacent the part boundary. If the pre-impregnated pre-form used in the present invention were moulded with a tool having a down-shear located at the part boundary, the top half and bottom half of the forming tool would become locked when resin moves into the region of the down-shear because gravity and pressure would cause the resin to migrate far down into the down shear. The present invention provides an advantage of including the up-shear 26, 28 which prevents the molten material from migrating through the cavity 20 to the down-shear 27, 29 portion of the compression moulding tool since the molten resin 31 has to go against gravity. This prevents tool lock-up and allows for compression moulding using pre-impregnated pre-forms 30 having continuous reinforcements within the pre-form.

Additionally the embodiment shown in FIG. 4 provides the maintenance benefits of a down shear mould tool, while still providing an up shear 28 at the run off edge 24, which is necessary for molding pre-impregnated pre-form 30 in the compression moulding tool 11. In FIG. 4 there is a wear surface area 40 located on the bottom half 16, which is easier to do maintenance on because when the compression moulding tool 11 is in the open position, the bottom half 16 can be directly accessed without having to bend down and work upside down, which is the case if the wear surface is on the top half 12. In FIG. 5 a wear surface area 40' is located on the top half 12, which is harder to do maintenance on because the top half 12 is not as easily accessible and a person dong maintenance must bend down to work on the top half 12, which is overhead.

The up-shear 26, 28 as described herein means that the edge of the formed part, when formed in the mould, goes upward relative to the finished surface of the part. This prevents continuous un-chopped fibers 36, 36' of the pre-impregnated pre-form 30 from sticking or jamming the top half 12 and bottom half 14 of the compression moulding tool 11 together, which can occur with down shear edges.

The compression moulding arrangement 10 further includes a pre-impregnated pre-form 30 material having uncured resin with continuous un-chopped reinforcements that extend across one of an entire length, width, or both the length and width of the pre-impregnated pre-form 30. It is also within the scope of this invention for the un-continuous reinforcements to be chopped reinforcement materials or fibers. The pre-impregnated pre-form 30 can include a resin material with the reinforcements in the resin material itself, or the pre-impregnated pre-form 30 is formed of multiple layers as shown in FIG. 7.

Figure 7:
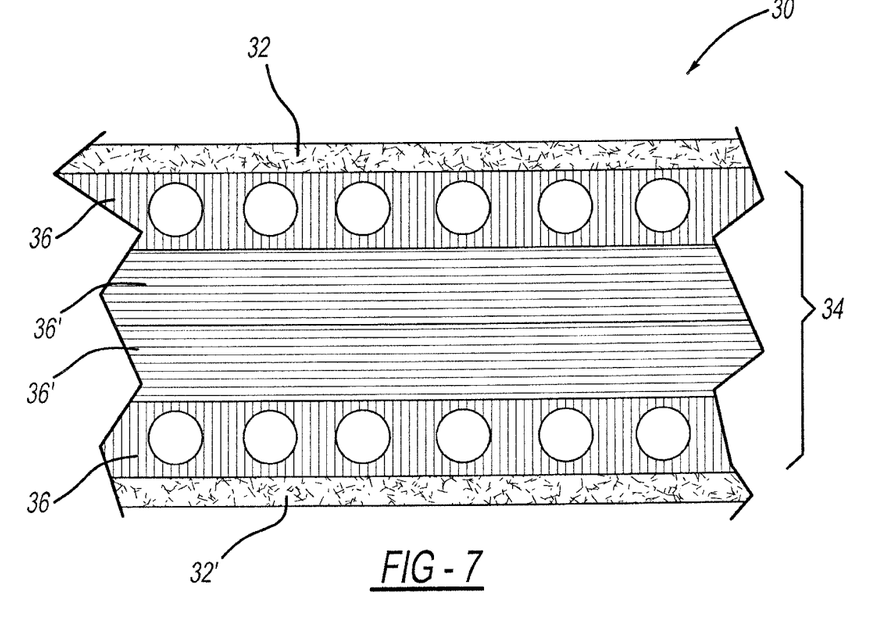
FIG. 7 is a partially cross-sectional side plan view of the pre-impregnated pre-form in accordance with one embodiment of the invention.

FIG. 7 shows six different layers; however, it is within the scope of this invention for any number of layers to be used depending on the particular application. Referring now to FIG. 7, the pre-impregnated pre-form 30 has two outer layers 32, 32' of uncured resin with a core 34. The core 34, as shown in FIG. 7 are four alternating layers 36, 36' of fiber material which extend across the entire length or width of the pre-impregnated pre-form 30. As shown in FIG. 7, one of the fiber layers 36 extends across the pre-form in one direction, while the other fiber layer 36' extends in a direction approximately ninety degrees to the adjacent layer and then repeated. It is within the scope of this invention for a greater or lesser number of layers to be implemented in a core 34. It is also within the scope of this invention for the core 34 to be a fiber board or pre-fabricated core such as cardboard, foam, honeycomb and corrugated material sandwiched between the two outer layers 32, 32'.

The pre-impregnated pre-form 30 has a thickness generally up to 30 mm, preferably less than 0.4 mm to greater than 3 mm and preferably 0.8 mm and 1.5 mm. The continuous un-chopped fibers 36, 36' are formed of one or more of the following types of fibers including carbon fibers, woven fibers, glass, aramid fibers, Kevlar®, as well as combinations of these various fibers. The individual layers of continuous un-chopped fiber 36, 36' may be alternating plies of material having a thickness generally greater than or equal to 0.1 mm up to including 0.6 mm and preferably 0.2 mm. As shown in FIG. 7 the alternating layers of unchopped fibers 36, 36' are surrounded by resin material and are not necessarily fibers; however, it is within the scope of this invention for the unchopped fibers 36, 36' to not be surrounded or suspended in resin material. The two outer layers of uncured resin 32, 32' include uncured resin material from a group including epoxy resins, urethanes, vinyl esters, and combinations of these materials. In another embodiment of the invention, multiple plies can create a pre-impregnated preform and it is possibly for the pre-impregnated preform 30 to be stacked plies 36, 36' with unchopped fibers surrounded be resign material and not have the two outer layers 32, 32' of uncured resign. Such an embodiment would cure the resin material surrounding the unchopped fibers.

Figure 9:
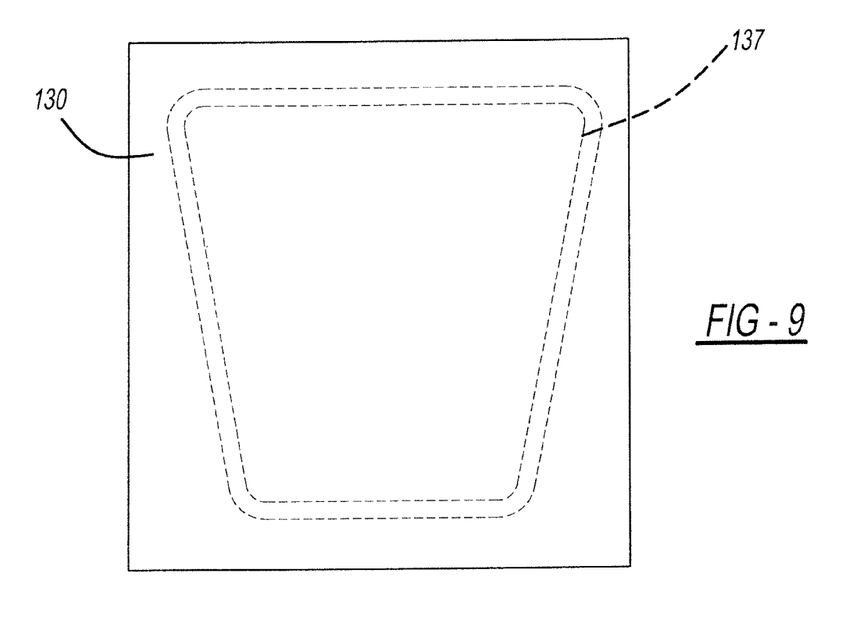
FIG. 9 is an overhead plan view of an alternate pre-impregnated pre-form in accordance with an alternate embodiment of the invention.

Referring now to FIG. 9, an alternate embodiment of the invention shows a pre-impregnated pre-form 130 which has a number of pre-cuts 137 formed through the pre-impregnated pre-form 130. When the pre-impregnated pre-form 130 is placed within a compression moulding arrangement 10, the pre-cuts 137 help to form desired angles and surfaces in the completed part. When using the compression moulding arrangement 10 in forming parts having a sharp angle, it is helpful to provide pre-cuts 137 on the pre-impregnated pre-form 130 in order to cause the pre-impregnated pre-form 130 to mould at sharp angles without ruining the surface quality of the completed part.

The present invention also includes a compression moulding arrangement 10 method that includes the steps of providing the pre-impregnated pre-form 10 having the uncured resin 32,32' with continuous un-chopped fibers 36, 36' that extend across one of an entire length, or width, or both the length and width of the pre-impregnated pre-form 30.

The method further includes the step of providing a compression moulding tool 11 having the bottom half 16 and top half 12 moveable between an open position and a closed position. The compression moulding tool 11 has includes the forming cavity 20 that is defined by the forming surface 14 of the top half 12 and a forming surface 18 of the bottom half 16 when the compression moulding tool 11 is in the closed position.

The method further includes the step of providing the forming surface 18 of the bottom half 16 of the compression moulding tool 11 with the boundary 22 defined by the run-off edge 24 and up-shear 26, 28, where the up-shear 26, 28 is a portion of the forming cavity 20 that move upward relative to the finished surface of the part 30, 31.

Next during is the step of preheating the compression tool 11 and moving the compression moulding tool 11 to an open position where the top half 14 and bottom half 18 are moved away from each other. The temperature that the compression moulding tool 11 is heated to depends the melting point of the uncured resin 32, 32' of the pre-impregnated preform. The movement of the compression moulding tool 11 between the open position and closed position includes the top half 12 and bottom half 16 moving away from each other both sequentially or simultaneously or one of the top half 12 and bottom half 16 is held stationary, while the other of the top half 12 or bottom half 16 is moved away from the stationary top half 12 or bottom half 16.

After the step of preheating the step of inserting a pre-impregnated pre-form 30 into the bottom half 18 of the compression moulding tool 10 occurs. This step also optionally includes a draw vacuum applied through vacuum ports in the bottom half 16 or top half 12 of the mould tool 11. The vacuum draw helps to hold the pre-impregnated preform 20 in place during moulding. The draw vacuum can be applied at the present step only or can be continuously applied throughout the moulding process. Additionally the amount of vacuum can be monitored using a vacuum gage. Then the compression moulding tool 11 is closed causing the pre-impregnated pre-form 30 to become heated and pressurized or squeezed due to the heat within the compression moulding tool 11 and force of the top half 12 of the compression moulding tool 11 being applied toward the bottom half 16 of the compression moulding tool 11 with the pre-impregnated pre-form 30 located between the top half 12 and the bottom half 16, thereby moving the compression moulding tool 11 to the closed position. It is within the scope of this invention for the top half 12 and bottom half 16 to be moved in the opposite direction to the directions stated in the paragraph above concerning the step of opening the compression moulding tool 11.

The next step in the method involves forming the pre-impregnated pre-form 30 into a finished part by causing the uncured resin to become molten resin 31 within the forming cavity 20. During the forming step the up-shear 26, 28 limits the molten resin 31 from moving past the run-off edge 24 and up-shear 26, 28.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

What is claimed is:

1. A compression moulding arrangement comprising: a pre-impregnated pre-form having uncured resin with continuous un-chopped reinforcements that extend across one of an entire length, width, or both the length and width of the pre-impregnated pre-form;
   a compression moulding tool having a bottom half and a top half movable between an open position and a closed position, wherein the compression moulding tool has a forming cavity that is defined by a forming surface of the top half, a forming surface of the bottom half when the compression moulding tool is in the closed position, wherein there is further provided a run-off edge which terminates at an upshear which is a portion of the forming cavity; and
   wherein the forming surface of the bottom half has a boundary defined by the run-off edge and the upshear, wherein said upshear is a portion of the forming surface that extends upward relative to the finished surface of the part and is located adjacent the run-off edge and the upshear limits molten material from the pre-impregnated pre-form from migrating further out of the forming cavity, thereby preventing the compression moulding tool from being locked in place by the use of the pre-impregnated pre-form.

2. The compression moulding arrangement of claim 1 wherein the pre-impregnated pre-form has a thickness between 0.8 mm and 1.5 mm.

3. The compression moulding arrangement of claim 1 wherein the pre-impregnated pre-form has a thickness between 0.4 mm and 3 mm.

4. The compression moulding arrangement of claim 1 wherein the pre-impregnated pre-form has a fiber core enveloped by two resin laminate sheets with the entire pre-impregnated pre-form having a thickness up to 30 mm.

5. The compression moulding arrangement of claim 1 wherein the pre-impregnated pre-form includes an uncured resin material, one selected from the group consisting of epoxy resins, urethanes, vinyl esters, and combinations thereof.

6. The compression moulding arrangement of claim 1 wherein said continuous un-chopped fibers are one selected from the group consisting of carbon fibers, woven fibers, glass, aramid fibers, Kevlar®, and combinations thereof.

7. The compression moulding arrangement of claim 1 wherein the pre-impregnated pre-form has one or more pre-cuts formed on the pre-impregnated pre-form to assist in moulding angles on the pre-impregnated pre-form during a compression moulding process.

* * * * *